(12) United States Patent
Zehlka

(10) Patent No.: US 11,534,025 B2
(45) Date of Patent: Dec. 27, 2022

(54) CONVERTIBLE MULTIPURPOSE COOKING MAT

(71) Applicant: Malana Zehlka, Phoenix, AZ (US)

(72) Inventor: Malana Zehlka, Phoenix, AZ (US)

( * ) Notice: Subject to any disclaimer, the term of this patent is extended or adjusted under 35 U.S.C. 154(b) by 243 days.

(21) Appl. No.: 16/837,965

(22) Filed: Apr. 1, 2020

(65) Prior Publication Data

US 2020/0315399 A1 Oct. 8, 2020

Related U.S. Application Data

(60) Provisional application No. 62/827,887, filed on Apr. 2, 2019.

(51) Int. Cl.
*A47J 37/01* (2006.01)
*A47J 47/02* (2006.01)

(52) U.S. Cl.
CPC .............. *A47J 37/01* (2013.01); *A47J 47/02* (2013.01)

(58) Field of Classification Search
CPC . A47J 37/01; A47J 47/02; A47J 43/20; B65D 19/06; B65D 21/00; B65D 21/08; B65D 21/083; A21B 3/13
USPC ...................... 206/600; 220/573.1, 4.28, 682
See application file for complete search history.

(56) References Cited

U.S. PATENT DOCUMENTS

2013/0180515 A1* 7/2013 Zandbergen ............ A47J 36/26
126/25 R

FOREIGN PATENT DOCUMENTS

| DE | 9113595 U1 | 1/1992 | |
|---|---|---|---|
| DE | 102006006526 | * 8/2007 | ............. A21B 3/137 |
| DE | 102006006526 A1 | 8/2007 | |
| GB | 614828 | 12/1948 | |
| WO | 2005034633 A1 | 4/2005 | |
| WO | WO2005034633 | * 4/2005 | ............... A21B 1/00 |

OTHER PUBLICATIONS

Search Report and Non-Binding Opinion on Patentability issued from the European Patent Office in European Patent Application No. 20167859.6, which claims priority to U.S. Appl. No. 16/837,965.

* cited by examiner

*Primary Examiner* — Don M Anderson
*Assistant Examiner* — Elizabeth J Volz
(74) *Attorney, Agent, or Firm* — Michael W. Goltry; Robert A. Parsons; Parsons & Goltry, PLLC

(57) ABSTRACT

A convertible multipurpose cooking article for food products includes a mat for receiving food products, the mat including a first side and a second side extending between a first end and a second end, openings disposed throughout the mat, the mat being sufficiently flexible to be repeatedly flexed between an open configuration in which the mat is flat, and a closed configuration juxtaposing the first end and the second end in which the mat defines a continuous sidewall encircling a volume and the first side and the second side encircle opposed upper and lower openings to the volume, and a fastener assembly configured to be repeatedly secured, for securing the first end to the second end when the mat is in the closed configuration, and separated, the fastener assembly including a structure thereof proximate to the first end and a complemental structure thereof proximate to the second end.

16 Claims, 15 Drawing Sheets

CONVERTIBLE MULTIPURPOSE COOKING MAT

CROSS-REFERENCE TO RELATED APPLICATION

This application claims the benefit of U.S. Provisional Patent Application No. 62/827,887, filed 2 Apr. 2019, which is incorporated herein by reference.

FIELD OF THE INVENTION

The present invention relates to cooking articles. In particular, the present invention relates to a convertible multipurpose cooking article in the nature of a mat for receiving food products and that is sufficiently flexible for being repeatedly convertible between an open configuration, in which the mat is flat, and a closed configuration, in which the mat defines a food-receiving volume, and which additionally includes an integrated fastening assembly for releasably securing the mat in the closed configuration.

BACKGROUND OF THE INVENTION

Cookware and bakeware are types of food preparation articles commonly found in a kitchen. Bakeware comprises cooking vessels, such as saucepans and frying pans, intended for use on a stove or range cooktop. Bakeware comprises cooking vessels and trays intended for use inside an oven. Some articles are considered both bakeware and bakeware.

Of particular significance is flexible bakeware, light, flexible bakeware constructed of silicone or silicone/fiberglass. Flexible bakeware is commonly found in a variety of forms including, for example, loaf pans, muffin/cupcake pans, cake pans, and mats, which are placed in or on baking dishes and trays to prevent sticking. Although flexible bakeware is popular for domestic and professional use, each form of flexible cookware is inherently designed for a single purpose. As a result, those who favor flexible cookware customary accumulate it in numerous forms to meet various needs, which is costly and inherently clutters cupboard and countertop spaces. Accordingly, there is a need in the art for a flexible convertible multipurpose cooking article in the nature of a flexible mat that is simple in design, simple in structure, inexpensive, and easily and quickly convertible for multiuse purposes.

SUMMARY OF THE INVENTION

According to the principle of the invention, a convertible multipurpose cooking article for food products includes a mat for receiving food products, the mat including a first side and a second side extending between a first end and a second end, openings disposed throughout the mat, the mat being sufficiently flexible to be repeatedly flexed between an open configuration in which the mat is flat, and a closed configuration juxtaposing the first end and the second end in which the mat defines a continuous sidewall encircling a volume and the first side and the second side encircle opposed upper and lower openings to the volume, and a fastener assembly configured to be repeatedly secured, for securing the first end to the second end when the mat is in the closed configuration, and separated, the fastener assembly including a structure thereof proximate to the first end and a complemental structure thereof proximate to the second end. The structure and the complemental structure are integral with the mat. The structure includes one of a male profile and a female profile and the complemental structure includes the other one of the male profile and the female profile, wherein the female profile is configured to receive and releasably secure the male profile. The mat includes a first surface and a second surface, and the first surface between the first side and the second side defines the volume when the mat is in the closed configuration. The male profile extends outwardly from the second surface, and the female profile opens outwardly to the first surface. The second surface proximate to the first end and the male profile overlaps the first surface proximate to the second end and the female profile when the mat is in the closed configuration. The male profile and the female profile each extend from proximate to the first side to proximate to the second side. A central pull-tab protrudes from the male profile, a central opening extends through the mat to the female profile, and the pull-tab extends through and beyond the central opening when the mat is in the closed configuration and the male profile is received and releasably secured by the female profile. The male profile includes protrusions, and the female profile includes indentations.

According to the principle of the invention, a convertible multipurpose cooking article for food products includes a mat for receiving food products, the mat including a first surface, a second surface, a first side and a second side extending between a first end and a second end, openings disposed throughout the mat, an enlargement, extending outwardly from the second surface proximate to the first end, formed with a female profile that opens outwardly to the first surface, a male profile proximate to the second end extending outwardly from the second surface, the mat being sufficiently flexible to be repeatedly flexed between an open configuration in which the mat is flat, and a closed configuration in which the mat defines a continuous sidewall encircling a volume by the first surface, the first side and the second side encircle opposed upper and lower openings to the volume and the second surface proximate to the first end and the male profile overlaps the first surface proximate to the second end and the female profile, and the female profile is configured to repeatedly receive and releasably secure the male profile for repeatedly securing the first end to the second side when the mat is in the closed configuration. The enlargement and the male profile are integral with the mat. The enlargement, including the female profile, and the male profile each extend from proximate to the first side to proximate to the second side. A central pull-tab protrudes from the male profile, a central opening extends through the enlargement to the female profile, and the pull-tab extends through and beyond the central opening when the mat is in the closed configuration and the male profile is received and releasably secured by the female profile. The male profile includes protrusions, and the female profile includes indentations.

According to the principle of the invention, a convertible multipurpose cooking article for food products includes a mat for receiving food products, the mat including a first side and a second side extending between a first end and a second end, openings disposed throughout the mat, the mat being sufficiently flexible to be repeatedly flexed between an open configuration in which the mat is flat, and a closed configuration juxtaposing the first side and the second side in which the mat defines a continuous sidewall encircling a volume and the first side and the second side encircle opposed upper and lower openings to the volume, and a fastener assembly configured to be repeatedly secured, for securing the first end to the second end when the mat is in the closed configuration, and separated, the fastener assembly including a structure thereof proximate to the first end and a complemental structure thereof proximate to the second end, the mat being in the closed configuration and the structure and the complemental structure being secured, a first lid releasably applied over the first side closing the first opening to the volume, and a second lid releasably applied over the second side closing the second opening to the volume. The structure and the complemental structure are integral with the mat. The structure includes one of a male profile and a female profile and the complemental structure includes the other one of the male profile and the female profile, wherein the male profile is received and releasably secured by the female profile. The mat includes a first surface and a second surface, and the first surface between the first side and the second side defines the volume. The male profile extends outwardly from the second surface, and the female profile opens outwardly to the first surface. The second surface proximate to the first end and the male profile overlaps the first surface proximate to the second end and the female profile. The male profile and the female profile each extend from proximate to the first side to proximate to the second side. A central pull-tab protrudes from the male profile, a central opening extends through the mat to the female profile, and the pull-tab extends through and beyond the central opening. The male profile includes protrusions, and the female profile includes indentations.

According to the principle of the invention, a convertible multipurpose cooking article for food products includes a mat for receiving food products, the mat including a first surface, a second surface, a first side and a second side extending between a first end and a second end, openings disposed throughout the mat, an enlargement, extending outwardly from the second surface proximate to the first end, formed with a female profile that opens outwardly to the first surface, a male profile proximate to the second end extending outwardly from the second surface, the mat being sufficiently flexible to be repeatedly flexed between an open configuration in which the mat is flat, and a closed configuration in which the mat defines a continuous sidewall encircling a volume by the first surface, the first side and the second side encircle opposed upper and lower openings to the volume and the second surface proximate to the first end and the male profile overlaps the first surface proximate to the second end and the female profile, and the female profile is configured to repeatedly receive and releasably secure the male profile for repeatedly releasably securing the first end to the second side when the mat is in the closed configuration, the mat being in the closed configuration and the male profile received and releasably secured by the female profile, a first lid releasably applied over the first side closing the first opening to the volume, and a second lid releasably applied over the second side closing the second opening to the volume. The enlargement and the male profile are integral with the mat. The enlargement, including the female profile, and the male profile each extend from proximate to the first side to proximate to the second side. A central pull-tab protrudes from the male profile, a central opening extends through the enlargement to the female profile, and the pull-tab extends through and beyond the central opening. The male profile includes protrusions, and the female profile includes indentations.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Disclosed is a multipurpose convertible multipurpose cooking article for food products in the nature of a mat that is sufficiently flexible to be easily and repeatedly converted by being flexed between an open configuration in which the mat is flat, and a closed configuration in which the mat is a continuous sidewall, and which is configured with openings, which are dispersed throughout the mat, and an integrated fastener assembly useful for releasably securing the mat in the closed configuration. The mat is useful for receiving food products thereon, such as for baking, when the mat is in the open configuration, and is useful for receiving food products therein, such as for steaming or storage, when the mat is in the closed configuration. Opposed ends of the continuous sidewall defined by the mat when it is in the closed configuration can be closed by opposed lids for enclosing food products.

Figure 1:
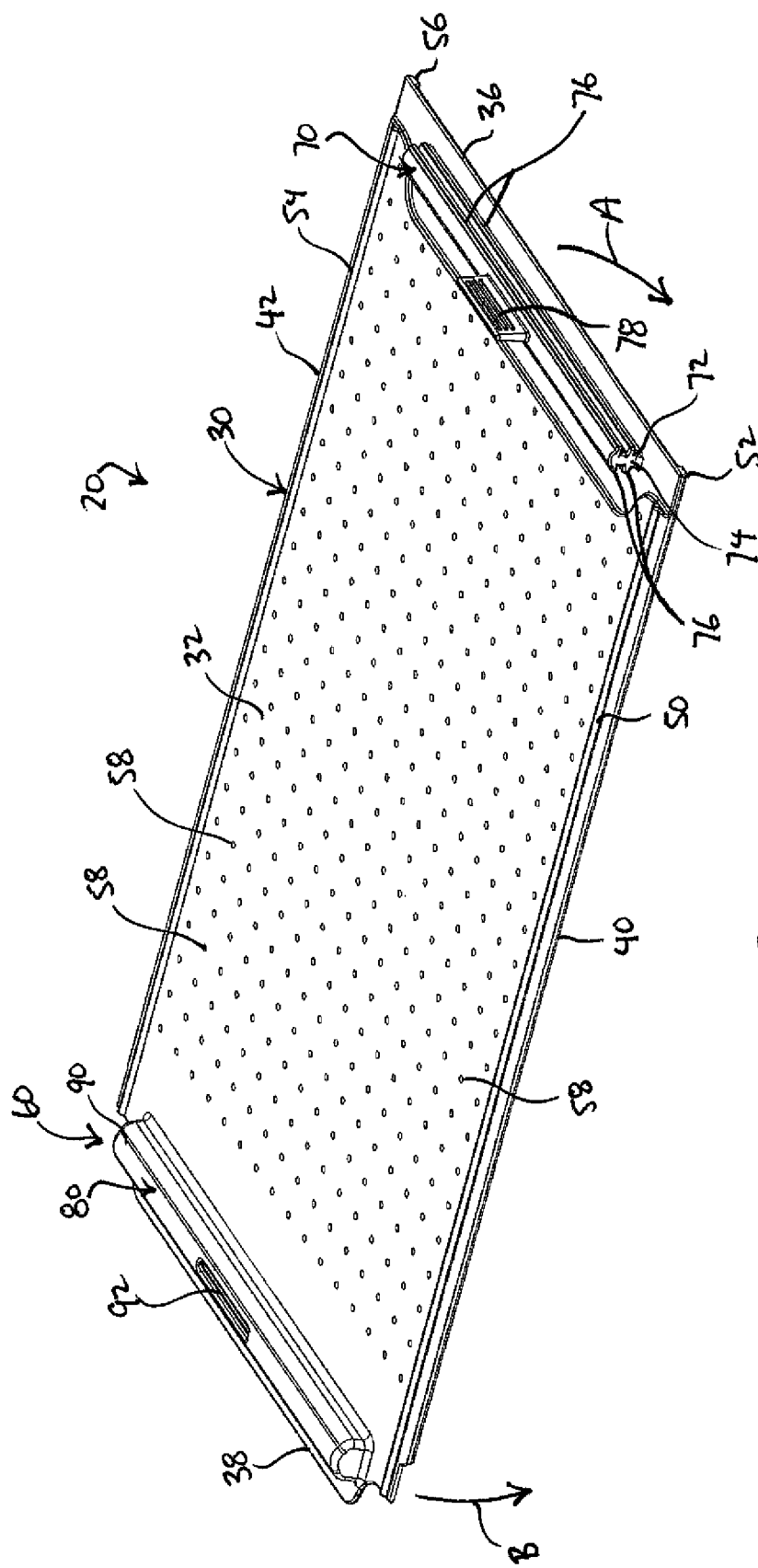
FIG. 1 is perspective view of a convertible multipurpose cooking article in the nature of a flexible mat constructed and arranged in accordance with the principle of the invention, the flexible mat shown in an open configuration in which the flexible mat is flat.

Turning now to the drawings, in which like reference characters indicate corresponding elements throughout the several views, attention is first directed to FIG. 1 illustrating a convertible multipurpose cooking article 20 in the nature of a mat 30 constructed and arranged in accordance with the principle of the invention. Mat 30 is a substrate, being a broad, generally flat piece of material having inherently food safe, non-toxic, flexible, elastic, durable, long-lasting, tear-resistant, non-stick and easy to clean material characteristics and which is heat resistant, being capable of withstanding bitter cold and intense heat, from −40° F. to up to 480° F. in a preferred embodiment. Exemplary materials having at least these inherent material characteristics include silicone and a silicone/fiberglass hybrid construction, both of which are commonly used in a variety of readily-available conventional silicone-type baking mats. Mat 30 is unitary, being an integral body.

Referring in relevant part to FIGS. 1-6, mat 30 includes opposed upper and lower surfaces 32 and 34, opposed ends 36 and 38, and opposed sides 40 and 42. Ends 36 and 38 are parallel to one another, sides 40 and 42 are parallel to one another, ends 36 and 38 are perpendicular relative to sides 40 and 42, ends 36 and 38 extend from side 40 to side 42, and sides 40 and 42 extend from end 36 to end 38. In this example, mat 30 has a uniform thickness of approximately from 0.75 mm to 1.5 mm from upper surface 32 to lower surface 34. The thickness of mat 30 can vary, being somewhat thicker or thinner, in alternate embodiments consistent with this disclosure and without disabling the inherently flexible, non-stick, and heat-resistant material characteristics of mat 30.

In this example, ends 36 and 38, the end marginal edges of mat 30, are equal in length, and sides 40 and 42, the side marginal edges of mat 30, are equal in length. The length of each of ends 36 and 38 is smaller than the length of each of sides 40 and 42. As a result, mat 30 is relatively thin and substantially rectangular body in this illustrative embodiment. In this example, ends 36 and 38 are each 4-8 inches long, and sides 40 and 42 are each 8-13 inches long, and this arrangement can be reversed in an alternate embodiment. Mat 30 can be formed of other dimensions and corresponding shapes consistent with this disclosure.

Mat 30 additionally includes beads 50 and 52, and beads 54 and 56. Each of beads 50, 52, 54 and 56 is a projecting rim, profile, or molding of mat 30. Beads 50 and 54 are enlargements and are identical, and beads 52 and 56 are enlargements and are identical. Beads 50 and 52 are proximate to side 40, and beads 54 and 56 are proximate to side 42. Bead 50 projects outwardly from upper surface 32 adjacent to side 40, and extends along substantially the entire length of mat 22 adjacent to side 40 between ends 36 and 38. Bead 54 projects outwardly from upper surface 32 adjacent to side 42, and extends along substantially the entire length of mat 22 adjacent to side 42 between ends 36 and 38. Bead 52 projects outwardly from lower surface 34 adjacent to side 40, and extends along substantially the entire length of mat 22 adjacent to side 40 between ends 36 and 38. Bead 56 projects outwardly from lower surface 34 adjacent to side 42, and extends along substantially the entire length of mat 22 adjacent to side 42 between ends 36 and 38. Beads 50 and 54 are uniformly shaped between ends 36 and 38, and project outwardly from the thickness of mat 30 from upper surface 32. Beads 52 and 56 are uniformly shaped between ends 36 and 38, project outwardly from the thickness of mat 30 from lower surface 34, and are somewhat larger than beads 50 and 54.

Mat 30 is a foraminate mat, being full of holes or openings 58 for the passage of gases and fluids. Openings 58 extend through mat 30 from upper surface 32 to lower surface 34, and are dispersed throughout mat 30. Openings 58 are spaced apart and formed substantially uniformly throughout mat 30 within the perimeter of mat 30 defined by ends 36 and 38 and sides 40 and 42. Openings 58 are arranged in a predetermined pattern throughout 30, and the chosen pattern can be a regular pattern or an irregular or random pattern. The density of openings 58 can vary in different embodiments.

Figure 11:
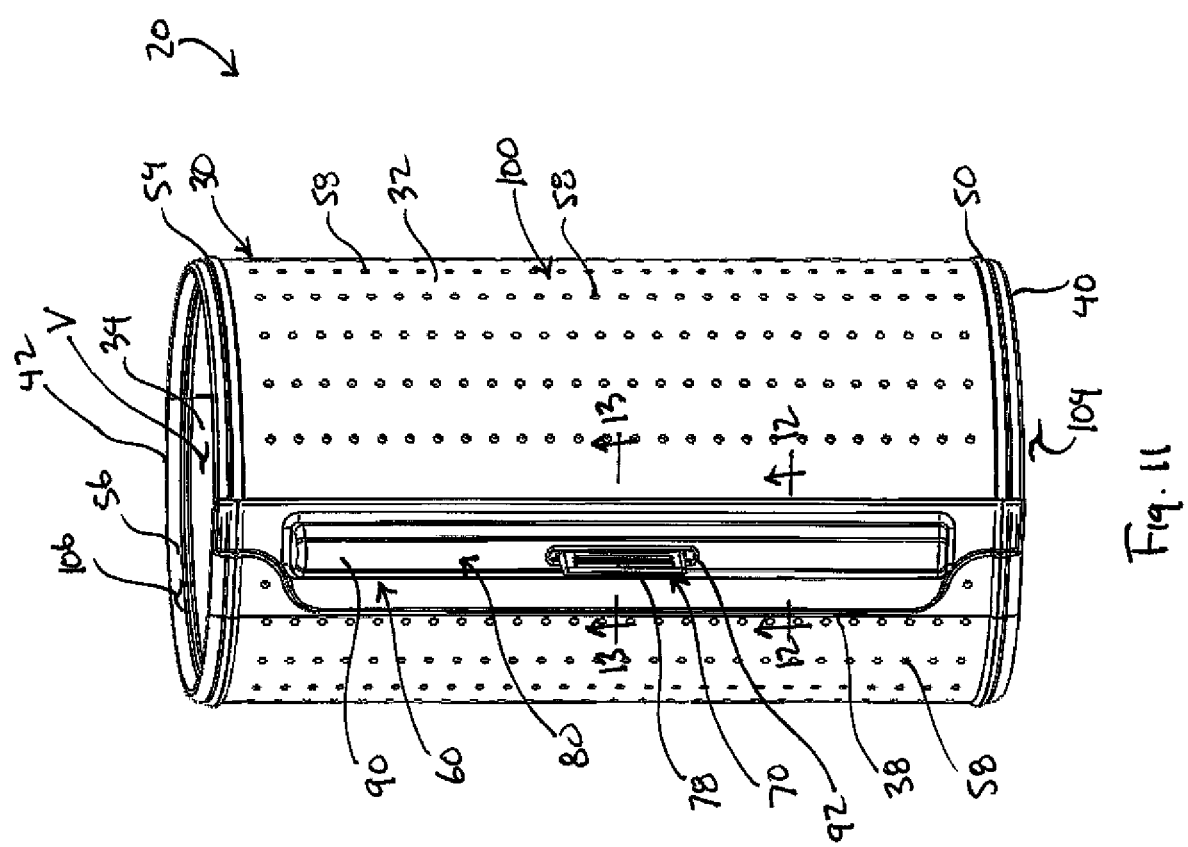
FIG. 11 is a perspective view of the embodiment of FIG. 1 illustrating the flexible mat in a closed configuration in which the flexible mat defines a continuous sidewall.

Mat 30 is sufficiently flexible to be easily and repeatedly converted by being flexed between an open configuration in FIGS. 1-6, in which mat 30 is flat, and a closed configuration in FIG. 11, in which mat 30 is arranged in a form of a continuous sidewall denoted generally at 100. Mat 30 is additionally configured with an integrated fastener assembly, denoted generally at 60. Fastener assembly 60 is reclosable, being specifically configured to be repeatedly secured and released for repeatedly securing mat 30 into and releasing mat 30 from its closed configuration in FIG. 11.

Fastener assembly 60 includes cooperating structures, including a structure 70 and a complemental structure 80, both of which are integral with mat 30 and formed of the same material as mat 30. Structure 70 is proximate to end 36 and is a profile denoted at 72 in FIGS. 1, 2, 4, 5, 7 and 8. Complemental structure 80 is proximate to end 38 and is a profile denoted at 82 in FIGS. 3, 9 and 10. Profile 72 extends along the length of end 36 from proximate to side 40 to proximate to side 42, and profile 82 similarly extends along the length of end 38 from proximate to side 40 to proximate to side 42. Profiles 72 and 82 are parallel relative to each other and to ends 36 and 38 of mat 30, and are perpendicular relative to sides 40 and 42 of mat 30. Profiles 72 and 82 are cooperating, interlocking profiles, in which they correspond in shape and size and are configured to be repeatedly interlocked and released to thereby repeatedly and releasably secure ends 36 and 38. In particular, profile 82 corresponds in shape and size to profile 72, being thereby configured to repeatedly receive and releasably secure via an interlocking engagement profile 72 to thereby repeatedly and releasably secure ends 36 and 38. In an illustrative embodiment, profile 72 is a male profile and may be referred to as such herein, and profile 82 is a female profile and may be referred to as such herein.

Figure 2:
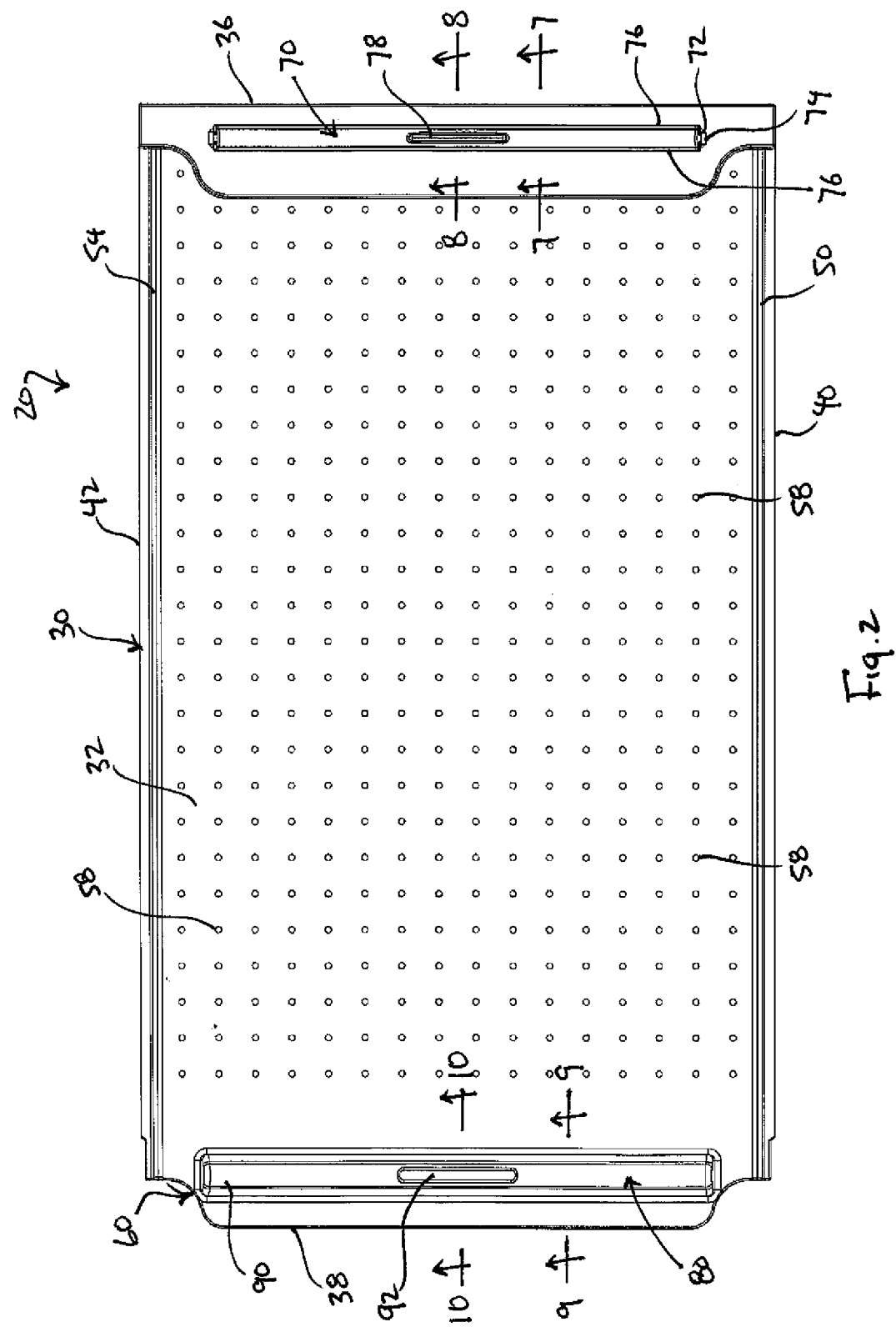
FIG. 2 is a top plan view of the embodiment of FIG. 1.
Figure 5:
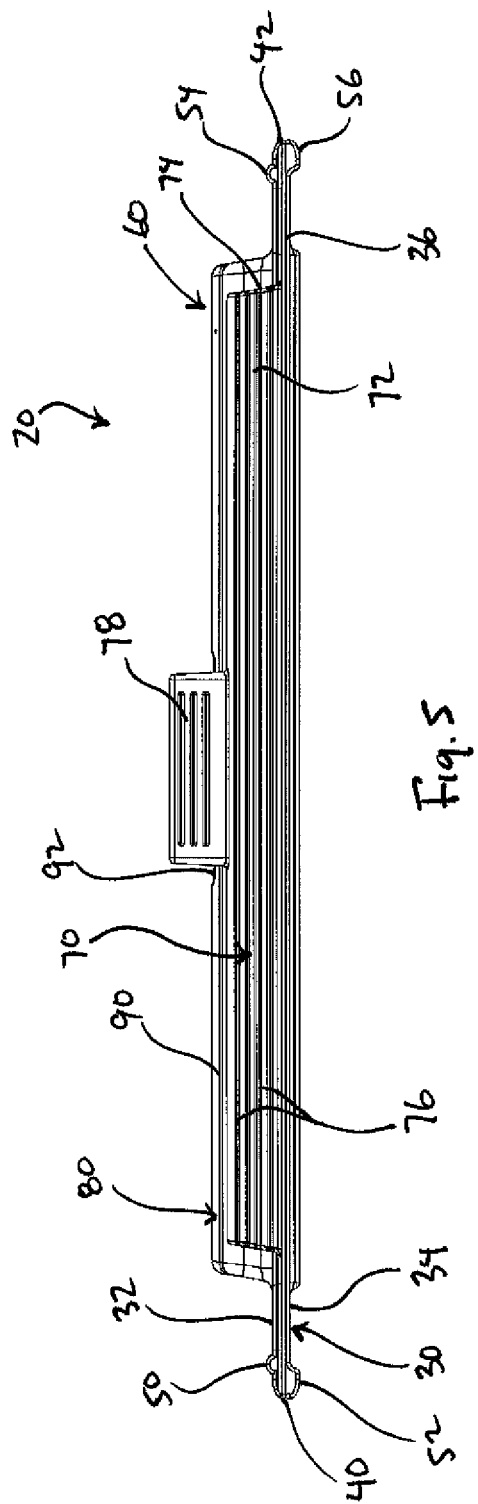
FIG. 5 is a first end elevation view of the embodiment of FIG. 1.
Figure 6:
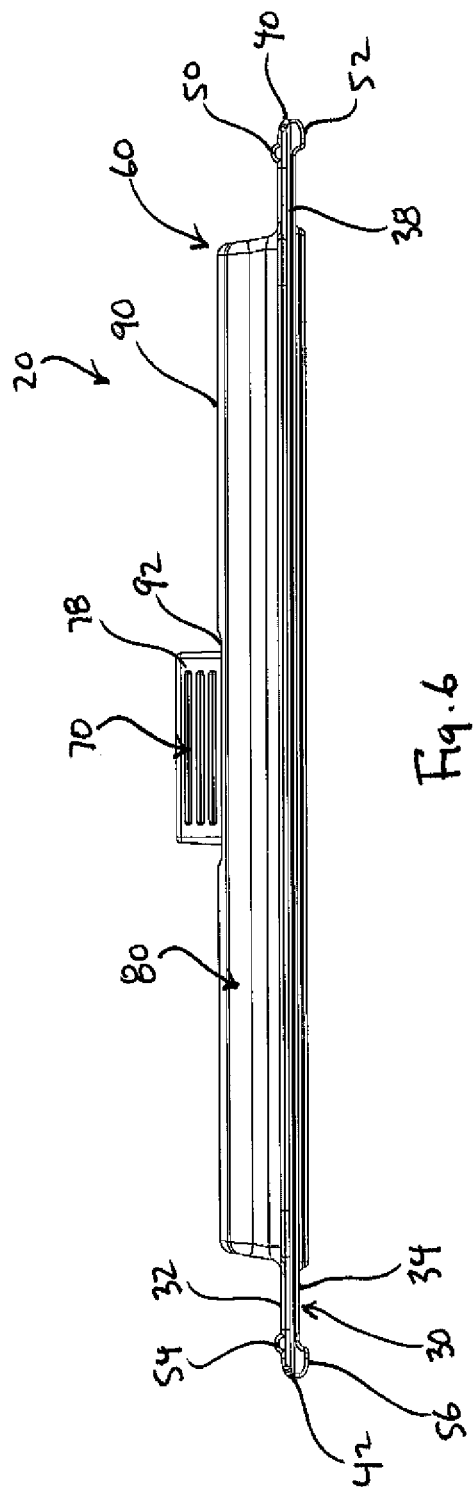
FIG. 6 is a second end elevation view of the embodiment of FIG. 1.
Figure 7:
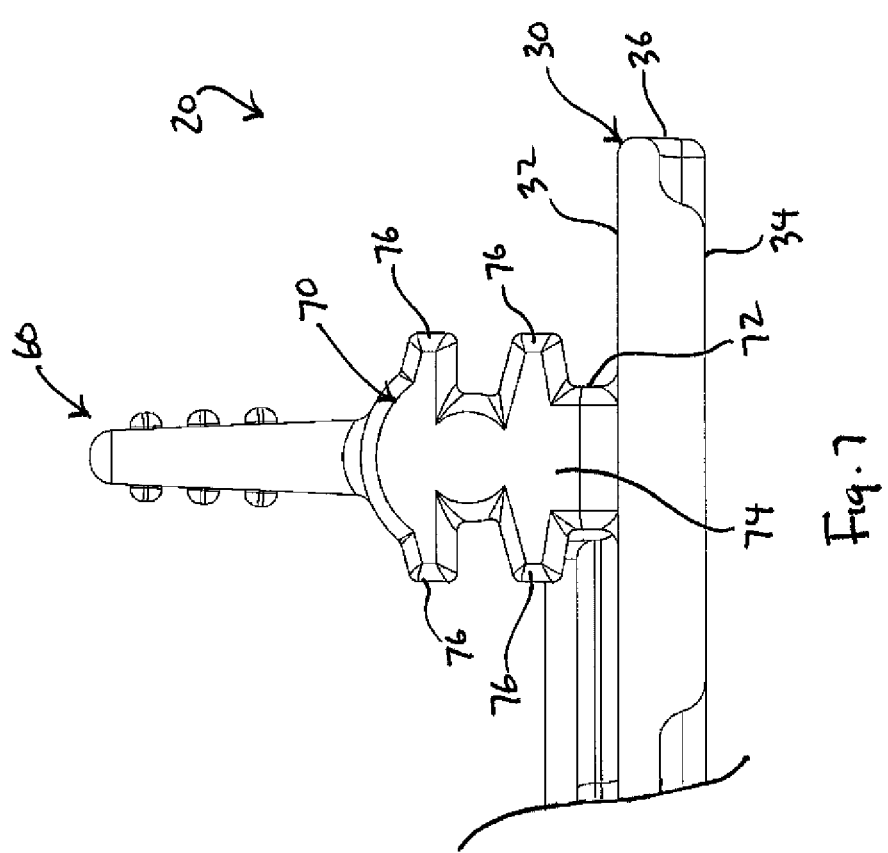
FIG. 7 is a section view taken along line 7-7 of FIG. 2.
Figure 8:
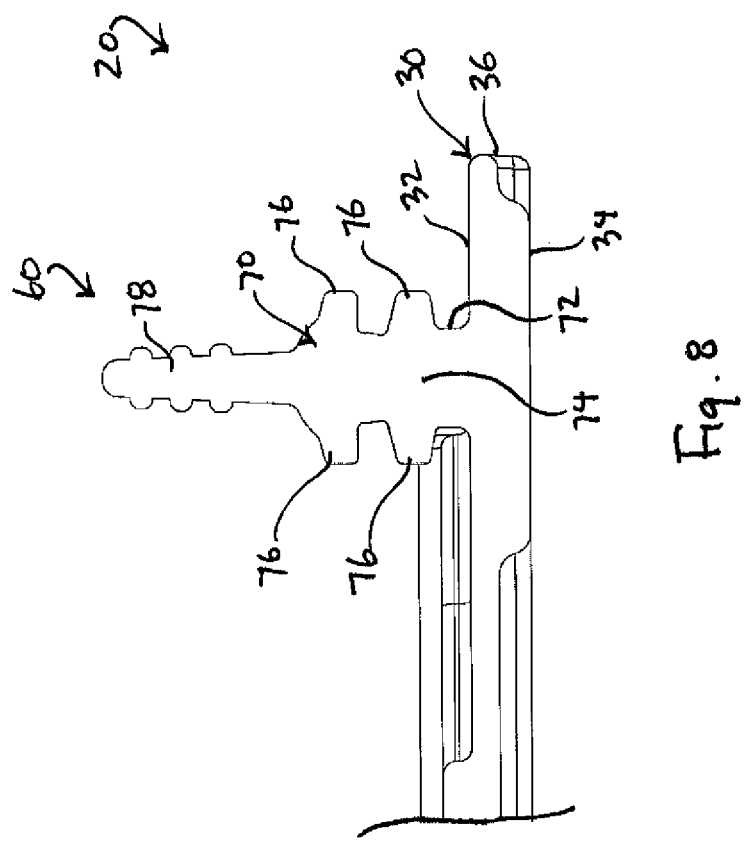
FIG. 8 is a section view taken along line 8-8 of FIG. 2.

Referring to FIGS. 7 and 8, male profile 72 is a tongue 74, an elongate projection that projects outwardly from upper surface 32 proximate to end 36 and extends along the length of end 36 from proximate to side 40 to proximate to side 42 in FIGS. 1, 2 and 5. Tongue 74 defines male profile 72 and is configured with protrusions 76, which extend outwardly from either side of tongue 74 along its length. Central pull-tab 78 protrudes outwardly from structure 70, i.e. tongue 74, at an intermediate position thereof between sides 40 and 42. Pull-tab 78 is integral with structure 70, i.e. tongue 74, and is suitably equidistant between sides 40 and 42.

Figure 3:
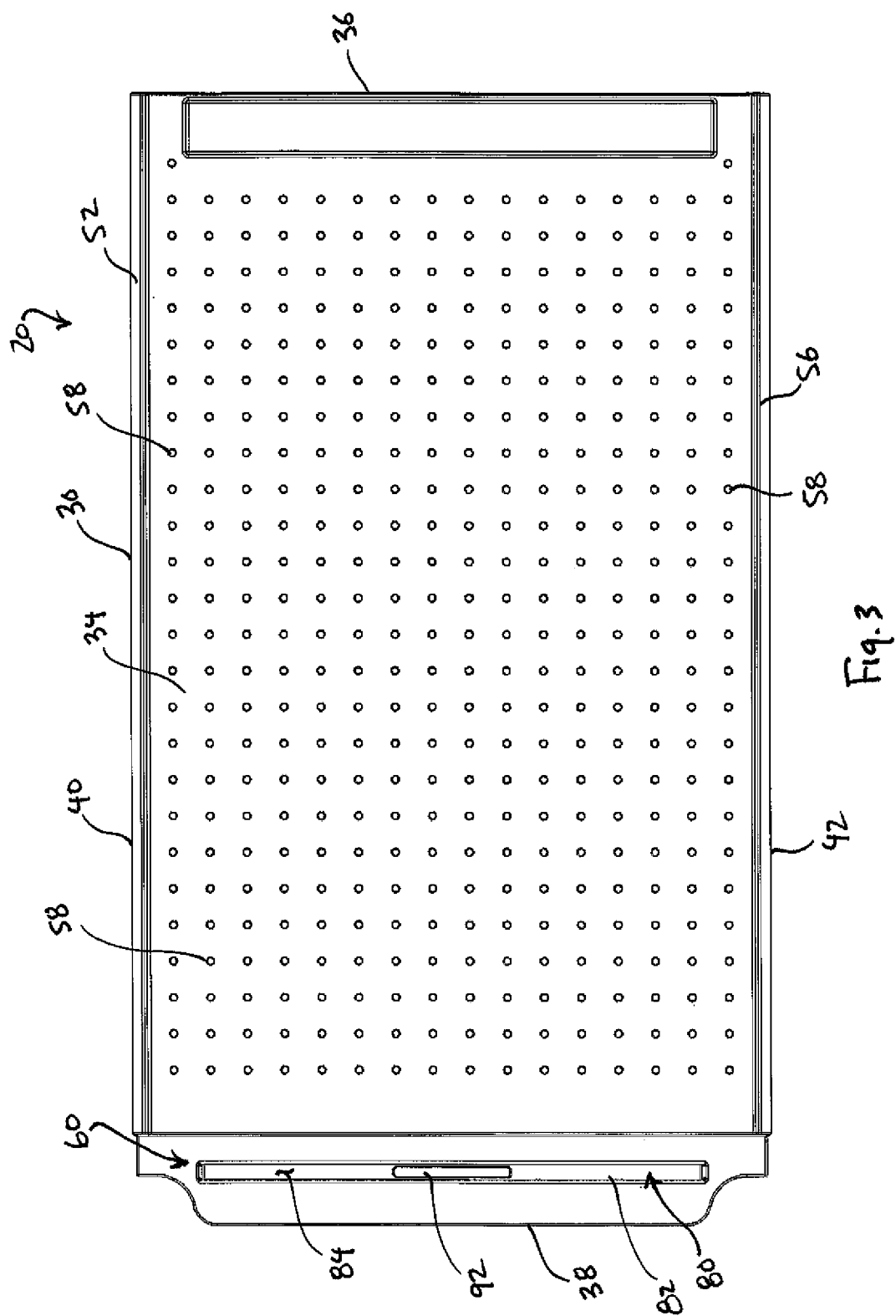
FIG. 3 is a bottom plan view of the embodiment of FIG. 1.
Figure 4:
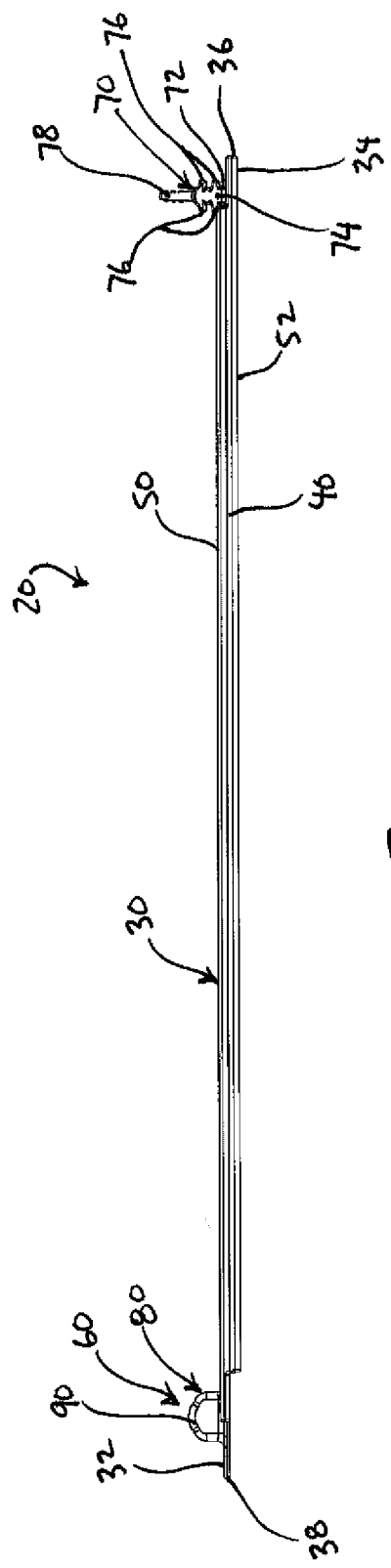
FIG. 4 is a side elevation view of the embodiment of FIG. 1, the opposite side elevation view being the mirror image thereof.
Figure 9:
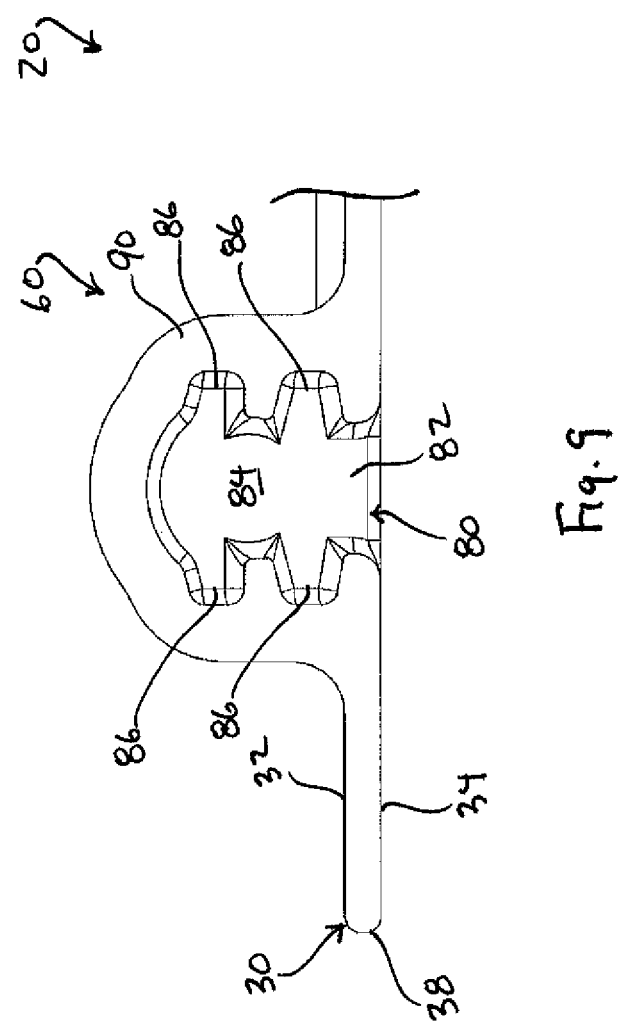
FIG. 9 is a section view taken along line 9-9 of FIG. 2.
Figure 10:
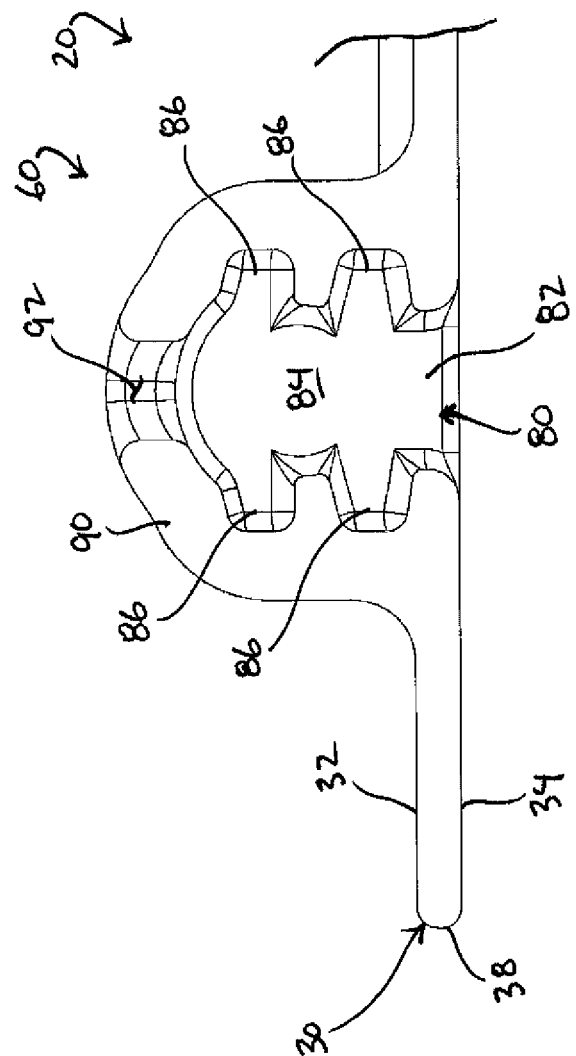
FIG. 10 is a section view taken along line 10-10 of FIG. 2.

Female profile 82 is a groove 84 in FIGS. 3, 9 and 10, which opens outwardly to lower surface 34 proximate to end 38 and extends along the length of end 38 from proximate to side 40 to proximate to side 42 in FIG. 3. Referring to FIGS. 9 and 10, groove 94 defines female profile 82 and is configured with indentations 86, which extend outwardly on either side of groove 84 along its length. The female profile 82 defined by groove 84 and its indentations 86 relates in size and shape male profile 80 defined by tongue 74 and its protrusions 76. Accordingly, male and female profiles 80 and 82 are cooperating profiles enabling them to be repeatedly interlocked to and released from one another.

Groove 84 and its indentations 86 that define female profile 82 are formed in an enlargement 90 in FIGS. 1, 2, 4, 5, 6, 9 and 10. Enlargement 90 is integral with mat 22 and formed of the same material as mat 30 and is a projecting rib that projects outwardly from upper surface 32 proximate to end 38 and extends along the length of end 38 from proximate to side 40 to proximate to side 42 as shown in FIGS. 1, 2, 5 and 6. In FIGS. 9 and 10, groove 84 formed in enlargement 90 opens outwardly to lower surface 34. Central opening 92 in FIGS. 1, 2, 3, 5, 6 and 10 extends through enlargement 90 of mat 22 to groove 84, i.e. complemental structure 80, at an intermediate position thereof between sides 40 and 42. Central opening 92 is suitably equidistant between sides 40 and 42, and is configured to accept the previously-described pull-tab 78.

As previously described, mat 30 is sufficiently flexible to be easily and repeatedly flexed and thereby converted between its open configuration in FIGS. 1-6, in which mat 30 is flat, and its closed configuration in FIG. 11, in which mat 30 is in a form of continuous sidewall denoted at 100. Fastener assembly 60 is re-closable and thereby specifically configured to be repeatedly secured, for securing end 36 to end 38 when mat 30 is in the closed configuration to secure mat 30 in it closed configuration, and separated for releasing mat 30 from its closed configuration.

When fastener assembly 60 is released, i.e. when structure 70 is released from complemental structure 80, mat 30 is unsecured in FIGS. 1-6 and can automatically become flat when placed upper surface 32 or lower surface 34 down on a flat surface. The ability of mat 30 to do this is a direct result of the inherently flexible and elastic material characteristics of mat 30. Mat 30 is repeatedly useful for baking food thereon when mat 30 is flat in its open configuration in FIGS. 1-6. Mat 30 can be selectively placed lower surface 34 down onto a baking sheet or tray and food placed on upper surface 32, or can be placed upper surface 32 down onto a baking sheet or tray and food placed on lower surface 34. Mat 30 is equally useful in both instances.

Figure 12:
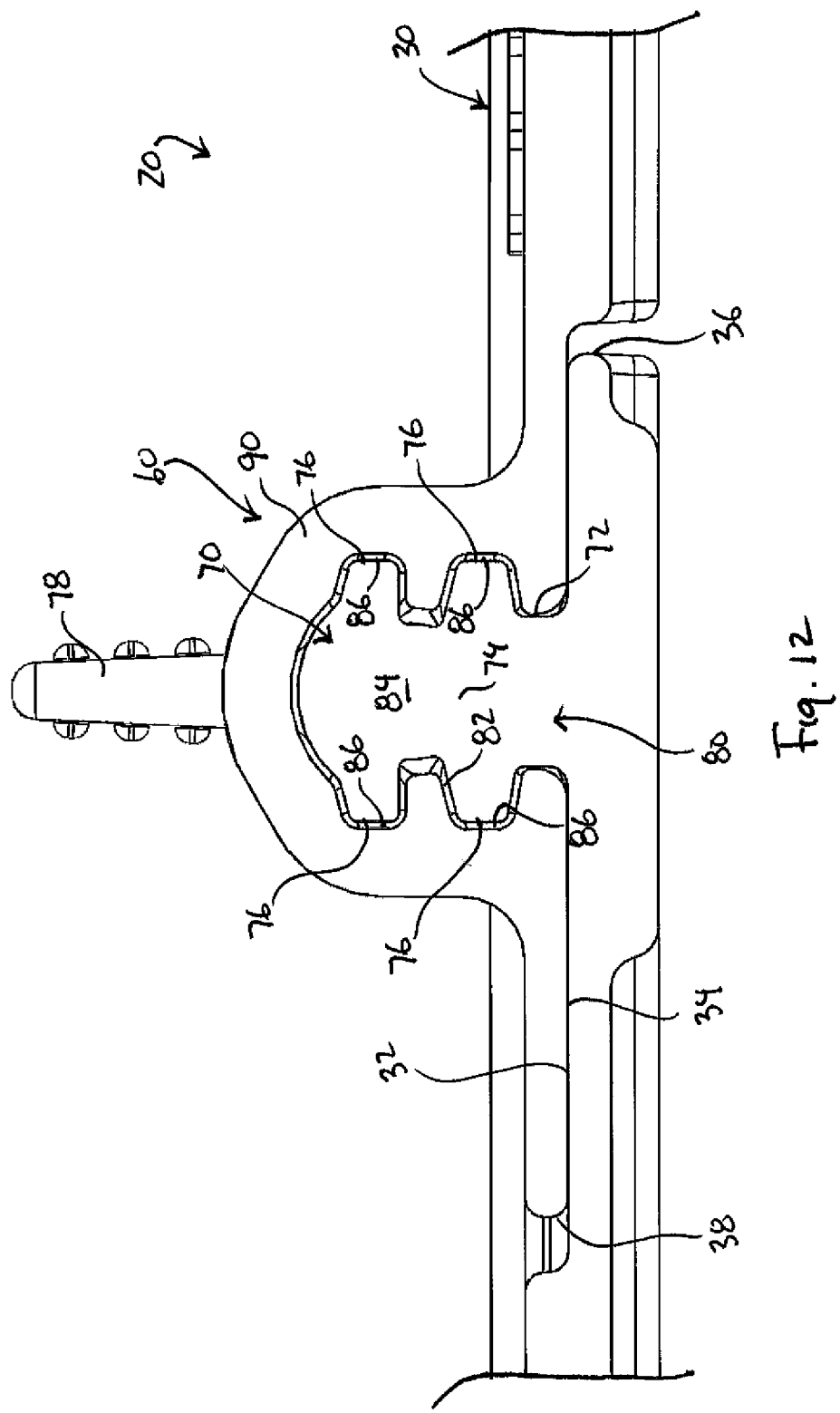
FIG. 12 is a section view taken along line 12-12 of FIG. 11.
Figure 13:
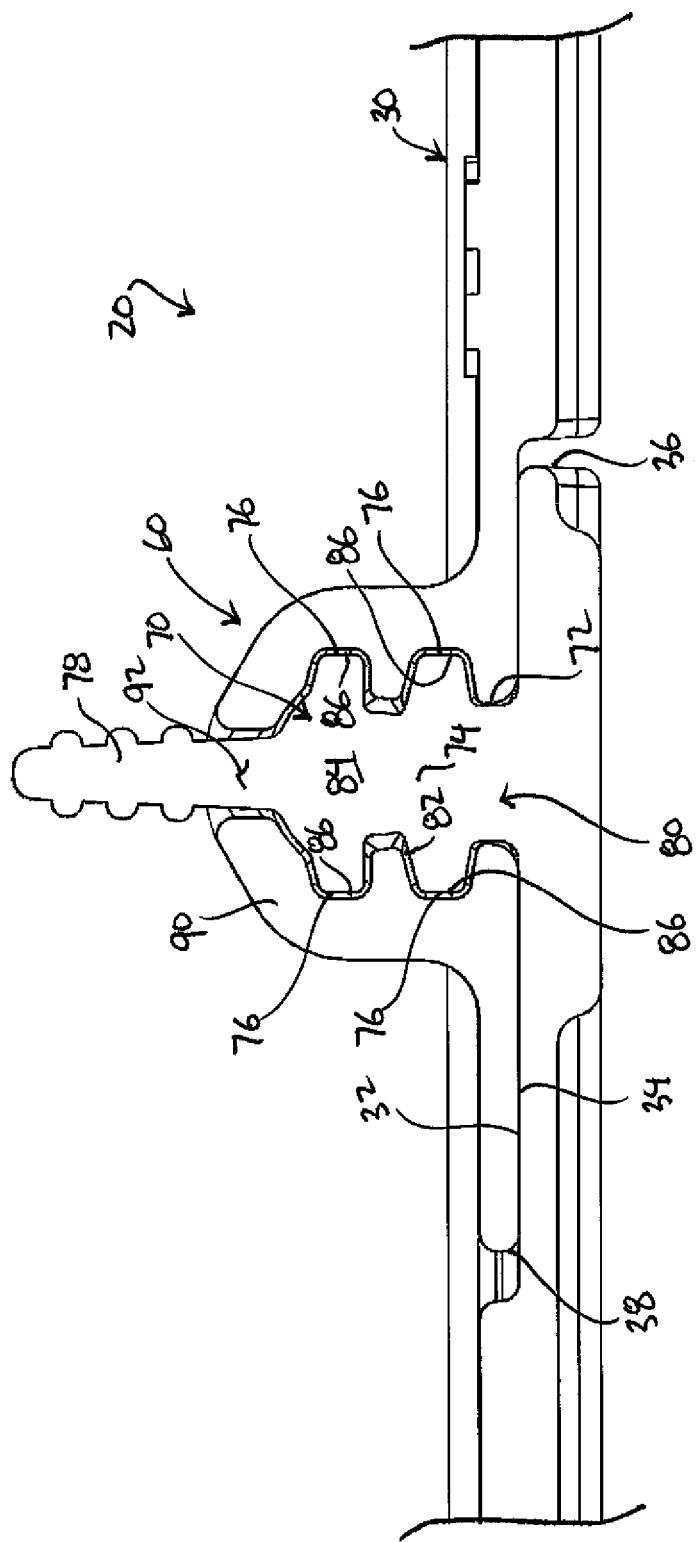
FIG. 13 is a section view taken along line 13-13 of FIG. 11.

To convert mat 30 from its open configuration in FIGS. 1-6 to its closed configuration in FIG. 11, ends 36 and 38 are folded inwardly toward one another in the respective directions of arrows A and B in FIG. 1 to register upper surface 32 along end 36 with lower surface 34 along end 38, tongue 74 that extends outwardly from upper surface 32 with groove 84 that opens outwardly to lower surface 34, and pull-tab 78 with central opening 92 through enlargement 90 of mat 30, and tongue 74 and groove 84 are pressed together to interlock them in FIG. 12, in which male profile 80 defined by tongue 74 and its protrusions 76 extends into female profile 82 defined by groove 84 and indentations 86 and protrusions 76 and indentations 86 of the respective male and female profiles 80 and 82 interlock. The inherently elastic and flexible material characteristics of mat 30 enable tongue 74 and enlargement 90 to suitably deflect when tongue 74 and groove 84 are pressed together and to assume their original shapes when tongue 74 is seated in and interlocked to groove 84. At the same time, pull-tab 78 inserts into and through central opening 92. The shape of tongue 84 and its protrusions 76 that male profile 72 of structure 70 interlocks with female profile 82 of complemental structure 80 as defined by groove 84 and its indentations 86, pull-tab 78 extends through and beyond central opening 92, and upper surface 32 of mat 30 proximate to end 36 and structure 70 overlaps lower surface 34 of mat 30 proximate to end 38 and complemental structure 80, when structure 70 and complemental structure 80 interlock in FIGS. 12 and 13 when mat 30 is in the closed configuration. Pull-tab 78 can be taken up by hand and pulled to facilitate seating male profile 80 of structure 70 as defined by tongue 74 and its protrusions 76 into female profile 82 of complemental structure 82 as defined by groove 84 and its indentations 86.

Cylindrical sidewall 100 that mat 30 forms when it is secured by fastener assembly 60 in its closed configuration in FIG. 11 includes an outer surface defined by upper surface 32, an inner surface defined by lower surface 34 that encircles volume V for receiving contents therein, side 40 that defines a continuous lower edge at a lower end of continuous sidewall 100 that encircles a lower opening 104 to volume V and side 42 that defines a continuous upper edge at an upper end of continuous sidewall 100 that encircles upper opening 106 to volume V. Volume V extends from lower opening 104 at the lower end of continuous sidewall 100 to upper opening 106 at the upper end of continuous sidewall 100.

Continuous sidewall 100 is repeatedly useful for steaming food contents placed into volume V, either from lower opening 104 or upper opening 106. After applying food contents to be steamed into volume V, the readied continuous sidewall 100 can be placed into a chosen steamer for steaming food contents placed in volume V in the presence of heat and steam, i.e., vaporized water. Openings 58 through the thickness of mat 30 suitably enable steam and ambient air to circulate relative to volume V to enable an efficient steaming of food placed in volume V.

Figure 14:
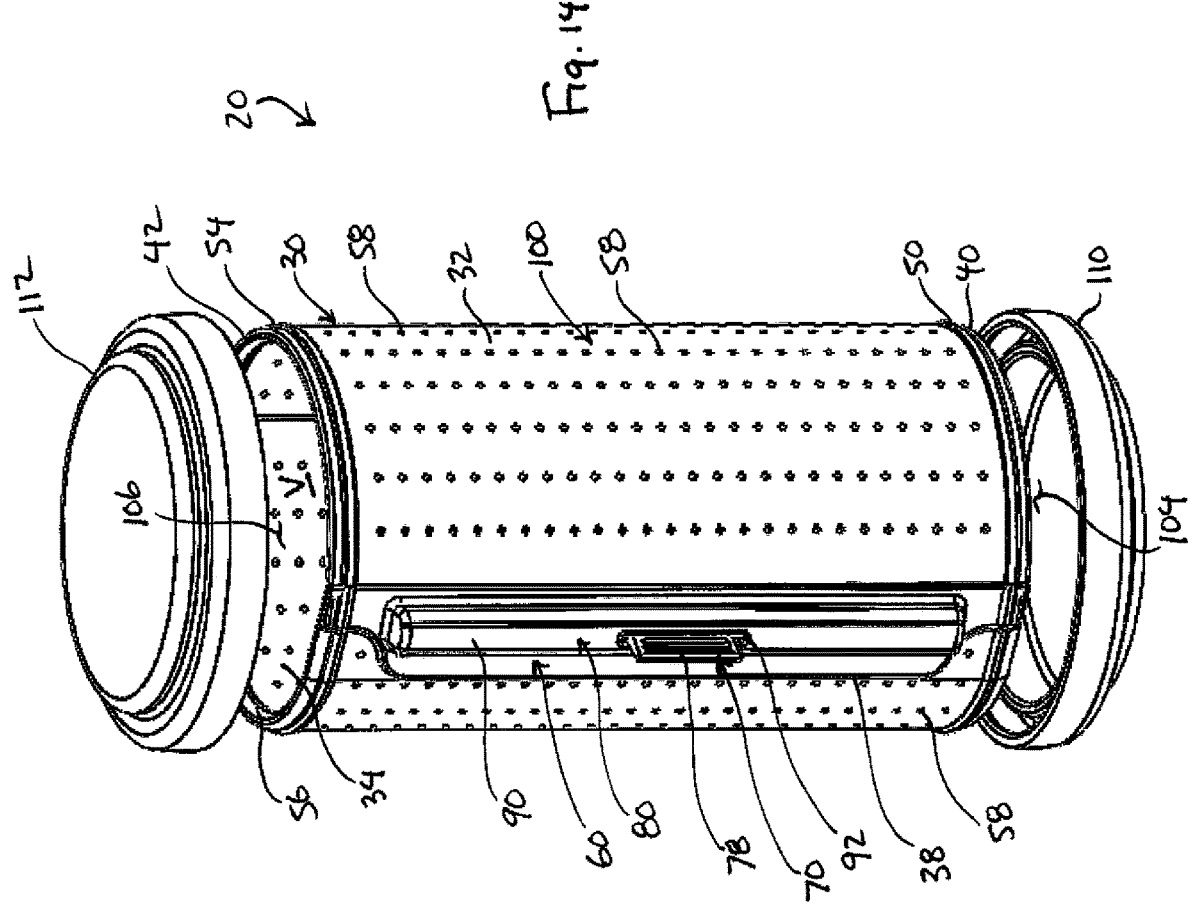
FIG. 14 is a view corresponding to FIG. 11 illustrating lids spaced apart from either end of the continuous sidewall.
Figure 15:
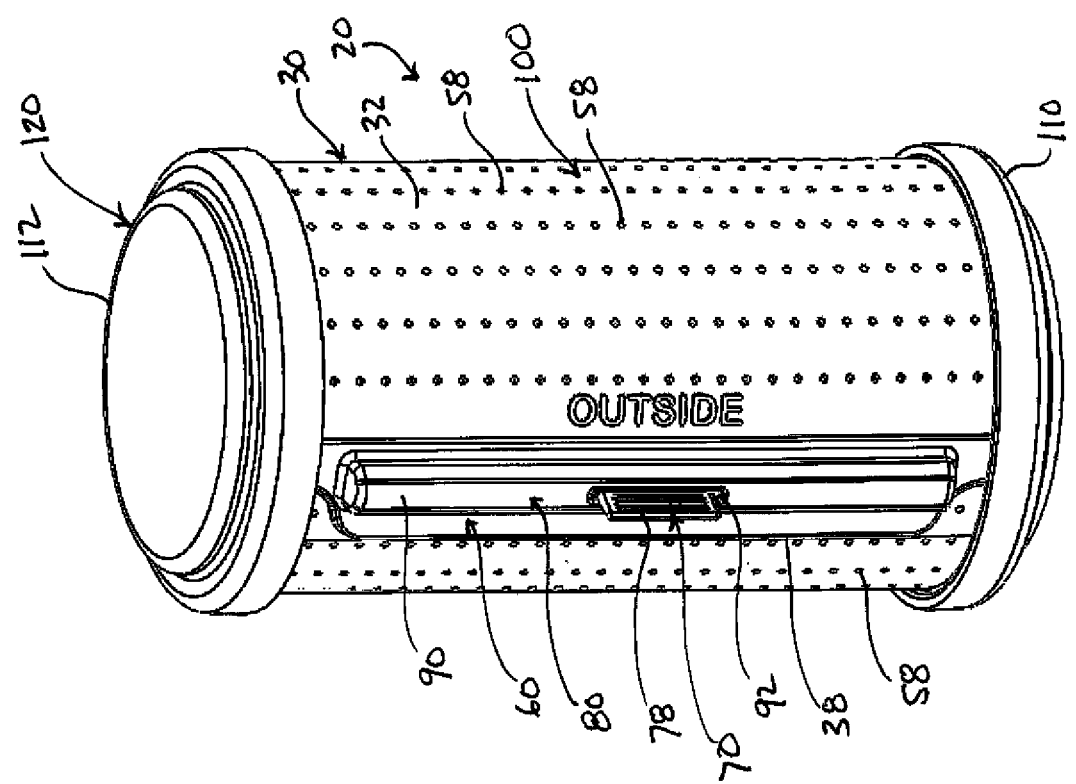
FIG. 15 is a view corresponding to FIG. 14 illustrating the lids applied to either end of the continuous sidewall.

Beads 50 and 52 formed in side 40 and beads 54 and 56 formed in side 42 inherently and advantageously reinforce the respective open lower and upper ends of continuous sidewall 100 thereby imparting a structural rigidity to continuous sidewall 100 enabling it to retain and hold its cylindrical shape. At the same time, beads 50 and 52 of side 40 define suitable lower engagement points for the attachment of a lower cap or lid 110 in FIG. 14 to side 40 defining the lower end of continuous sidewall 100 to close lower opening 104 to volume V and beads 54 and 56 of side 42 similarly define suitable upper engagement points for the attachment of an upper cap or lid 112 in FIG. 14 to side 40 defining the upper end of continuous sidewall 100 to close upper opening 106 to volume 106 for containing food contents placed in volume V, whether for steaming or storage. FIG. 14 illustrates lower and upper lids 110 and 112 detached from the respective sides 40 and 42 defining the respective lower and upper ends of continuous sidewall 100 in which lower and upper openings 104 and 106 are open. FIG. 15 illustrates lower and upper lids 110 and 112 applied over sides 40 and 42 (not shown because they are concealed by the attached lids 110 and 112) defining the respective lower and upper ends of continuous sidewall 100 in which lower and upper openings 104 and 106 (not shown because they are concealed by the attached lids 110 and 112) are closed to thereby enclose volume V (not shown) and any food contents placed therein and thereby forming a container assembly denoted generally at 120. Lower lid 110 can be repeatedly applied over and removed from end 40 as needed to close and open lower opening 104 and upper lid 112 can be similarly repeatedly applied over and removed form end 42 as needed to close and open upper opening 106. Lower and upper lids 110 and 112 are identical and interchangeable in the illustrative embodiment disclosed herein, and can be used independently from one another.

Container assembly 120 formed by the assembly of continuous sidewall 100 and lids 110 and 112 is useful for entrapping food contents placed in volume V, which can be placed into a chosen steamer for steaming the food contents in volume V of container 50 in the presence of heat and steam. Openings 58 through the thickness of mat 30 enable steam and ambient air to circulate relative to volume V for enabling an efficient steaming of the food contents in volume V. The container assembly 120 and its food contents can be removed from the steamer and one or both of the attached lids 110 and 112 detached to enable the withdrawal of the food contents from volume V after the steaming process is complete. Container assembly 120 is also useful for food storage, in which openings 58 through mat 30 enable air to circular relative to volume V for enabling food contents placed in volume V to remain fresh when stored therein.

According to the invention, profiles 72 and 82 are cooperating, interlocking profiles, being male and female profiles in the illustrative embodiment disclosed herein, in which they correspond in shape and size and are configured to be repeatedly interlocked and released to thereby repeatedly and releasably secure ends 36 and 38. Those having regard for the art will appreciate that varying cooperating, interlocking profiles can be used in structure 70 and complemental structure 80 of fastener assembly 60 without departing from the invention, including cooperating, interlocking strips, detents, and the like.

The present invention is described above with reference to illustrative embodiments. However, those skilled in the art will recognize that changes and modifications may be made in the described embodiment without departing from the nature and scope of the present invention. Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A convertible multipurpose cooking article for food products, said convertible multipurpose cooking article comprising a mat for receiving food products, the mat comprises a first surface, a second surface, a first side and a second side extending between a first end and a second end, an enlargement extending outwardly from the second surface proximate to the first end and formed with a female profile that opens outwardly to the first surface, a male profile proximate to the second end extending outwardly from the second surface, and is foraminate, being full of holes or openings therethroughout extending through the mat from the first surface to the second surface, and sufficiently flexible to be repeatedly flexed between an open configuration in which the mat is flat, and a closed configuration in which the mat defines a continuous sidewall encircling a volume by the first surface, the first side and the second side encircle opposed upper and lower openings to the volume and the second surface proximate to the first end and the male profile overlaps the first surface proximate to the second end and the female profile, the female profile is configured to repeatedly receive and releasably secure the male profile for repeatedly securing the first end to the second side when the mat is in the closed configuration, and the holes or openings enabling gases and fluids to pass therethrough when the mat is in the open configuration and the closed configuration.

2. The convertible multipurpose cooking article according to claim 1, wherein the enlargement and the male profile are integral with the mat.

3. The convertible multipurpose cooking article according to claim 2, wherein the enlargement, including the female profile, and the male profile each extend from proximate to the first side to proximate to the second side.

4. The convertible multipurpose cooking article according to claim 3, additionally comprising:
the male profile comprising protrusions extending outwardly from either side of a tongue;
the female profile comprising indentations extending outwardly from either side of a groove;
a pull-tab protruding from the tongue;
an opening through the enlargement to the female profile; and
the indentations configured to interlock with the respective protrusions and the pull-tab configured to extend through and beyond the opening when the mat is in the closed configuration and the male profile is received by the female profile.

5. A convertible multipurpose cooking article for food products, said convertible multipurpose cooking article comprising:
a mat for receiving food products, the mat comprises first surface, a second surface, a first side and a second side extending between a first end and a second end, and is foraminate, being full of holes or openings therethroughout extending through the mat from the first surface to the second surface, and sufficiently flexible to be repeatedly flexed between an open configuration in which the mat is flat, and a closed configuration juxtaposing the first side and the second side in which the mat defines a continuous sidewall encircling a volume and the first side and the second side encircle opposed upper and lower openings to the volume, and a fastener assembly configured to be repeatedly secured, for securing the first end to the second end when the mat is in the closed configuration, and separated, the fastener assembly comprising a structure thereof proximate to the first end and a complemental structure thereof proximate to the second end;
the mat being in the closed configuration, the structure and the complemental structure being secured, and the holes or openings enabling gases and liquids to pass therethrough;
a first lid releasably applied over the first side closing the first opening to the volume; and
a second lid releasably applied over the second side closing the second opening to the volume.

6. The convertible multipurpose cooking article according to claim 5, wherein the structure and the complemental structure are integral with the mat.

7. The convertible multipurpose cooking article according to claim 6, wherein the structure comprises one of a male profile and a female profile and the complemental structure comprises the other one of the male profile and the female profile, wherein the male profile is received and releasably secured by the female profile.

8. The convertible multipurpose cooking article according to claim 7, wherein the mat includes a first surface and a second surface, and the first surface between the first side and the second side defines the volume.

9. The convertible multipurpose cooking article according to claim 8, wherein the male profile extends outwardly from the second surface, and the female profile opens outwardly to the first surface.

10. The convertible multipurpose cooking article according to claim 9, wherein the second surface proximate to the first end and the male profile overlaps the first surface proximate to the second end and the female profile.

11. The convertible multipurpose cooking article according to claim 10, wherein the male profile and the female profile each extend from proximate to the first side to proximate to the second side.

12. The convertible multipurpose cooking article according to claim 11, additionally comprising:
the male profile comprising protrusions extending outwardly from either side of a tongue;
the female profile comprising indentations extending outwardly from either side of a groove;
a pull-tab protruding from the tongue;
an opening through the mat to the female profile; and the indentations interlocking with the respective protrusions and the pull-tab extending through and beyond the opening from the tongue.

13. A convertible multipurpose cooking article for food products, said convertible multipurpose cooking article comprising:

a mat for receiving food products, the mat including comprises a first surface, a second surface, a first side and a second side extending between a first end and a second end, an enlargement extending outwardly from the second surface proximate to the first end and formed with a female profile that opens outwardly to the first surface, a male profile proximate to the second end extending outwardly from the second surface, and is foraminate, being full of holes or openings therethroughout extending through the mat from the first surface to the second surface, and sufficiently flexible to be repeatedly flexed between an open configuration in which the mat is flat, and a closed configuration in which the mat defines a continuous sidewall encircling a volume by the first surface, the first side and the second side encircle opposed upper and lower openings to the volume and the second surface proximate to the first end and the male profile overlaps the first surface proximate to the second end and the female profile, the female profile is configured to repeatedly receive and releasably secure the male profile for repeatedly releasably securing the first end to the second side when the mat is in the closed configuration, and the holes or openings enabling gases and fluids to pass therethrough;

the mat being in the closed configuration, the male profile received and releasably secured by the female profile, and the holes or openings enabling gases and liquids to pass therethrough;

a first lid releasably applied over the first side closing the first opening to the volume; and a second lid releasably applied over the second side closing the second opening to the volume.

14. The convertible multipurpose cooking article according to claim 13, wherein the enlargement and the male profile are integral with the mat.

15. The convertible multipurpose cooking article according to claim 14, wherein the enlargement, including the female profile, and the male profile each extend from proximate to the first side to proximate to the second side.

16. The convertible multipurpose cooking article according to claim 15, additionally comprising:

the male profile comprising protrusions extending outwardly from either side of a tongue;

the female profile comprising indentations extending outwardly from either side of a groove;

a pull-tab protruding from the tongue;

an opening through the enlargement to the female profile; and the indentations interlocking with the respective protrusions and the pull-tab extending through and beyond the opening from the tongue.

* * * * *